Feb. 11, 1964 R. R. SEEBER, JR., ETAL 3,121,217

MEMORY AND CIRCUITS THEREFOR

Filed Aug. 12, 1960

3 Sheets-Sheet 1

FIG. 4

| | V11 | V12 | V13 | V91 | V92 | V93 | T951 | T952 | T953 | T911 | T912 | T913 | D97 | D91 |
|---|---|---|---|---|---|---|---|---|---|---|---|---|---|---|
| | | | | | | | | ONE | | | | ZERO | | ONE |
| PRIOR TO WRITING | B | B | S | S | S | B | | | | | | | | |
| VACANCY TEST | | | P | | P | | B | B | B | B | B | B | B | B |
| WRITE | | | S | | S | | S | | S | | S | | | S |
| A93 DELAYED | | | | B | B | S | | | | | | | | |

FIG. 5

| | | V11 | V12 | V13 | T151 | T152 | T153 | T111 | T112 | T113 | D17 | D11 |
|---|---|---|---|---|---|---|---|---|---|---|---|---|
| | | | | | | ONE | | | ZERO | | | ONE |
| VACANT REGISTER a. | PRIOR TO READING | S | S | B | S | B | S | B | S | B | B | S |
| | + READ | P | | | | | | | | | | |
| | + READ DELAYED | | | | | | | | | | | |
| | − READ | S | | | | | | | | | | |
| | − READ DELAYED | | | | | | | | | | | |
| MISMATCH b. | PRIOR TO READING | B | B | S | S | B | S | B | S | B | B | S |
| | + READ | | | | P | | | | | | | |
| | + READ DELAYED | | | | | | | | | | | |
| | − READ | | | | S | | | | | | | |
| | − READ DELAYED | | | | | | | | | | | |
| MATCH c. | PRIOR TO READING | B | B | S | S | B | S | B | S | B | B | S |
| | + READ | | | | | | | | | | | |
| | + READ DELAYED | | | | | | P | | | | | P |
| | − READ | | | | | | | | | | | |
| | − READ DELAYED | S | S | B | | | S | | | | | S |

FIG. 1

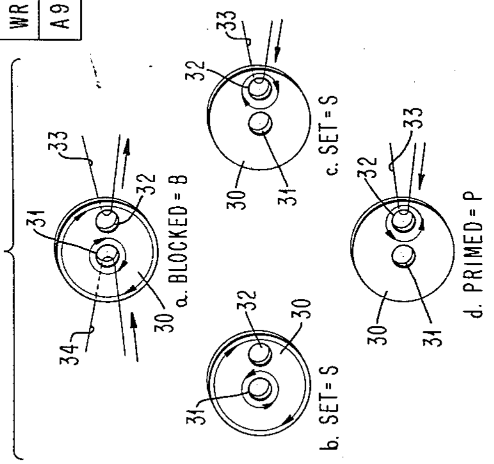

INVENTORS
ROBERT R. SEEBER JR
FRANK B. HARTMAN

BY Melvin P. Williams

AGENT

United States Patent Office 3,121,217
Patented Feb. 11, 1964

3,121,217

MEMORY AND CIRCUITS THEREFOR

Robert R. Seeber, Jr., and Frank B. Hartman, Poughkeepsie, N.Y., assignors to International Business Machines Corporation, New York, N.Y., a corporation of New York Filed Aug. 12, 1960, Ser. No. 49,276
7 Claims. (Cl. 340—174)

This invention relates to improved logical circuits and more particularly to simplified logical circuits of the type which provide functions suitable for associative memory apparatus in data processing.

In data processing and computing machines, in which a plurality of data records may be stored in a multiple-register memory, the recognition of a particular data record is sometimes accomplished by associating with said data record a group of identifying data bits which is frequently called a "tag." The use of a tag attached to the data record for identification purposes permits placing the data record into an unknown location or register in storage, it being possible to thereafter search through all of the storage locations to find the data record bearing the correct tag. It also is possible to let the storage locations identify themselves as either vacant or occupied so that data may be stored therein only if vacant. When a data record is read out of storage, there may be no need to maintain the record; that being the case, the register should be made available to store a subsequent data record. Sometimes it is desirable to save the data record in storage, for repeated reference. Therefore, it should be possible to either retain the data or make the register available for storing a subsequent record. One simple way to accomplish this is to have a nondestructive readout, and perform the erase function as an initial part of a subsequent writing operation, using vacancy circuits to indicate whether or not the register is available for a subsequent record. In order to have a maximum number of registers identified, with a minimum number of bits in each tag, it is desirable to be able to use a particular tag to identify a subsequent data record after a prior record which was identified thereby is no longer being retained for future reference. However, since records which are to be retained no longer are erased only at the start of writing of a subsequent word, the prior record may be still stored in a register, and it would be erroneously read out, since it would have the proper tag. This problem tends to nullify the simplifying advantages of nondestructive readout.

In order to be able to identify the registers which are available for storage of new records, it is necessary that the vacancy indicating means be conditioned at the end of each reading operation to show the register as vacant, if the undestroyed data therein is no longer needed, or to show the register as occupied, if the data record therein is to be preserved. The devices heretofore available for doing this have been rather complicated, requiring storage and logic functional means. In the development of a tag-addressed memory, the large number of identical registers (and supporting equipment therefor) has to be considered. In order to provide enough circuitry to handle a useful amount of data without an excessive bulk of equipment and attending prohibitions on cost, space, and power, the design criteria of memories necessarily hinge on the elements used as the basis for establishing storage and switching functions. In a large memory apparatus, the storage and switching functions are so interrelated, and the number of elements involved is so great that physical arrangements of the elements in simple planes or other easily workable groups are to be desired. A single type of element is therefore frequently used to provide most of the functions of a memory apparatus, the elements being arranged in simple geometric arrays. The manner in which the elements are used in the actual circuits provided is important in obtaining simplicity without which a memory apparatus becomes so bulky and expensive as to be impractical.

It is an object of this invention to provide an improved tag-addressed memory.

It is another object to provide simplified storage and switching logical circuits.

Other objects of the invention include the following:

To provide a tag-addressed memory having automatic nondestructive readout adapted for simple control over the retention or ultimate destruction of data.

To provide a tag-addressed memory having nondestructive readout, with simple data retention control means; and to provide such a memory with self-operated vacancy indicating means.

To provide a tag-addressed memory requiring a minimum of adjunctive devices.

To provide a tag-addressed memory comprised of simplified circuitry which permits a minimum of interconnection means between the parts thereof.

To provide logical circuits which operate to re-establish themselves following performance of their functional objectives.

To provide self-operating logical circuits adaptable for vacancy recognition in memory circuits.

To provide simplified logical circuits having data comparison capabilities.

To provide self-operating logical circuits adaptable to perform comparison functions in a memory circuit.

In an associative memory in accordance with the present invention the register containing the desired data record is selected not only on the basis of having the correct tag but also on the basis that the register must be one which is currently identified as occupied and not vacant. This prevents a "vacant" register from being identified on the basis of the tag alone, which tag may have been used to identify a prior record which is in the register, but which is no longer significant. The invention includes a novel memory array in which nondestructive readout is automatically accomplished, and the register from which data is read is automatically identified as vacant unless an external instruction prevents it. When data is to be retained, the external instruction causes the automatic vacancy indication to be prevented, maintaining the "occupied" status of the containing register.

The invention also includes novel recognition circuits for performing, among other things, the vacancy recognition functions necessary for a tag-addressed memory. Novel comparison circuits are provided which are useful in identifying data, for instance data stored in a tag-addressed memory of the type disclosed herein. It will be apparent from the description of the preferred embodiments, that the various inventive features herein permit much simpler tag-addressed memory circuits than were heretofore obtainable, and that such circuits are also inherently more reliable and much more easily maintained.

In the embodiment shown, our invention contemplates the use of a storage element capable of assuming either an active condition in which it may be switched between two stable states respectively representing the binary bits One and Zero, or inactive condition. The element includes a control circuit adapted to place said element in the active and inactive conditions, a switching circuit effective when the element is in the active condition for placing the element in either of said stable states, and sensing circuits for detecting the condition and/or state of the element. Our invention, as embodied herein, comprises the above-described element utilized in circuits including, among others, a logical comparison circuit that is response-polarized in a manner permitting the simplest of interconnections, and in a recognition circuit within which the various functions are isolated and therefore mutually independent except when self-control over the states thereof is desired, and which is compatibly operable in conjunction and said comparison circuits without buffering or other isolation means. The characteristics of this type of element are utilized to provide circuits which are responsive only to correct interrogations, and which are operable to condition themselves for further operation in the original state, or in a different state, as necessary.

One example of such an element, which is used for illustrative purposes in the preferred embodiment disclosed, is a magnetic core made of well-known "square loop" material and having three flux paths or, alternatively stated, two apertures therein. This type of magnetic core is discussed in detail in an article entitled "The Transfluxor," by J. A. Rajchman and A. W. Lo, which appeared in the Proceedings of the IRE, volume 44, No. 4, March 1956, as pages 321–332. The use of three-path cores in basic logical circuits required for a tag-addressed memory system having vacancy recognition represents a considerable saving in initial cost, manufacturing problems, maintenance and space.

The foregoing and other objects, features and advantages of our invention will be apparent from the following more particular description of preferred embodiments thereof as illustrated in the accompanying drawings.

In the drawings:

FIG. 1 is a schematic diagram illustrating the operation of a three-path core.

FIG. 4 is an operation chart illustrating the selective change of the states of various cores in writing operations.

FIG. 5 is an operation chart illustrating the selective change of the states of various cores in reading operations.

*Introduction*

Figure 2:
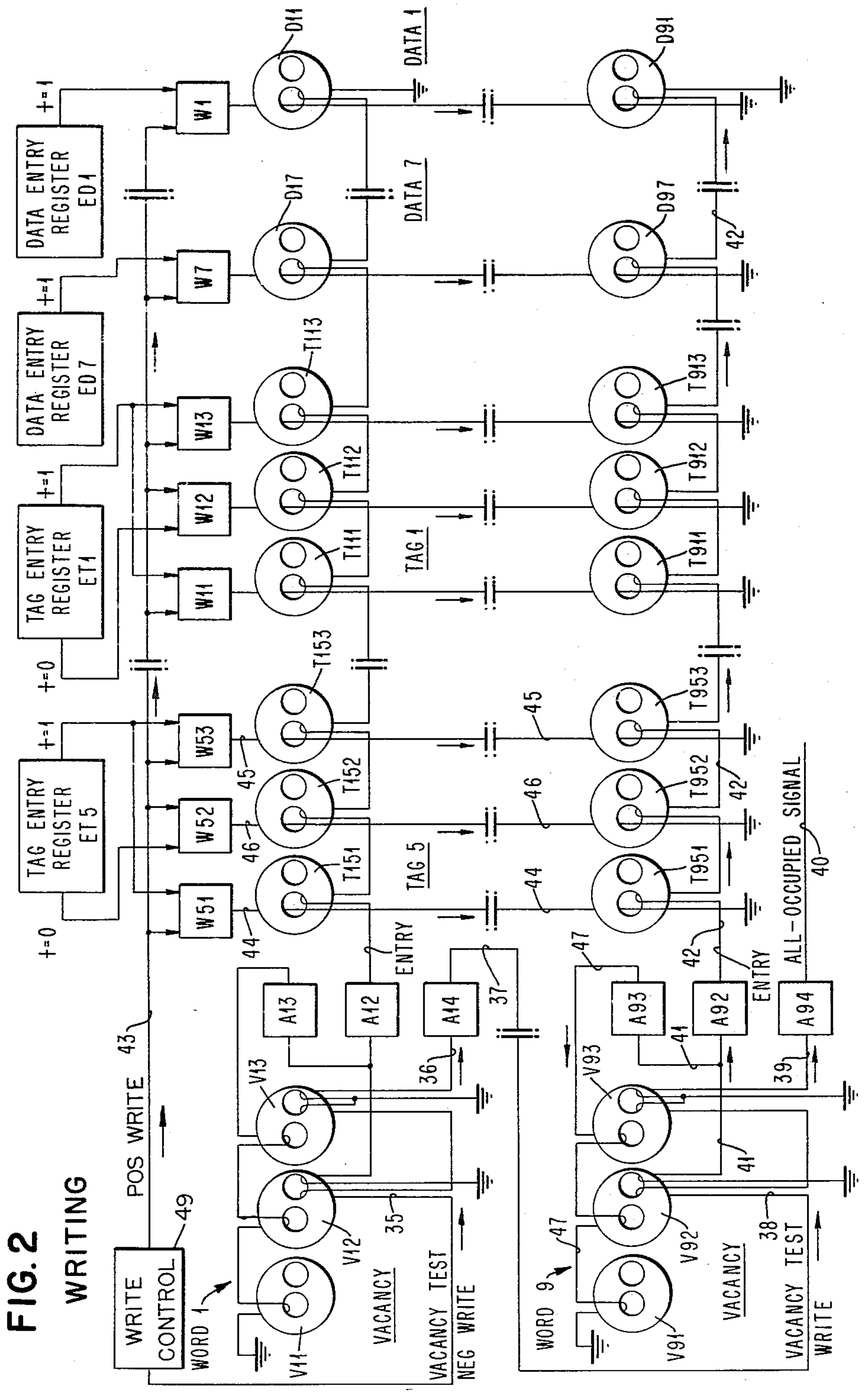
FIG. 2 is a simplified schematic diagram of one embodiment of the invention, in which the cores of the type shown in FIG. 1 and the writing circuits of a tag-addressed memory array are shown.

A three-path core used to illustrate one embodiment of this invention is shown in FIG. 1. The finer details of operation may be obtained from the IRE article referred to hereinbefore; the understanding of the operation of this type of core in the circuits to be described does not require more than a cursory examination of the characteristics (and an understanding of possible spurious effects due to excessive driving currents) about to be described. A three-path core 30 (FIG. 1*a*), having left, middle, and right-hand flux paths formed by a left-hand aperture 31 and a right-hand aperture 32 is shown in an inactive condition which will be called the Blocked condition, wherein the core is saturated with upward flux in the left-hald path and downward flux in the middle and right-hand path. In this state, any normal current applied to a winding 33 through the right-hand aperture 32 will have no effect on the core, since the direction of flux in the left-hand path must be changed in order to change the direction of flux in either the middle or the right-hand path; the direction of flux in the left-hand path cannot be changed without passing the current through the left-hand aperture 31 over winding 34. If a current is passed over winding 34 in the direction of the arrow, it will tend to generate more clockwise flux; the left-hand path of the core being saturated in that direction, the current will have no effect. The only way that the core can be brought out of the Blocked condition is to apply current to the winding 34 through the aperture 31 in the direction opposite to the direction of the arrow in FIG. 1*a*. This current will tend to reverse the flux in the left-hand path, and will tend to change the direction of flux around both apertures from the clockwise to the counterclockwise direction. If the current is limited to a proper amount, hereinafter referred to as I*m*, the result will be to change only half the flux in the left-hand path as shown in FIG. 1*b*, the net effect of which is nearly zero flux in that path and a clockwise flux about the aperture 32, shown in FIG. 1*c*; this is the set state of the core. On the other hand, if current is excessive, the core could be inversely blocked with all flux opposite to that shown in FIG. 1*a*; however, the amount of current required for reverse blocking is so great as to be easily avoided, and of no consequence here. In FIG. 1*c*, it can be seen that application of current to the winding 33 through the right-hand aperture 32 in the direction of the arrow as shown will have no effect upon a Set core, because this merely tends to drive the core further into saturation in the clockwise direction about the aperture 32. However, if current is applied to the winding 33 in the direction opposite to the arrow shown in FIG. 1*c*, the direction of the flux about the aperture 32 will change from the clockwise to the counterclockwise direction, as shown in FIG. 1*d*, leaving the core in what is called the Primed state. When the core is Primed, current applied to the winding 33 in the direction opposite that of the arrow shown in FIG. 1*d* will have no effect upon the core, but current applied in the direction of the arrow will switch the core back into the Set state, shown in FIG. 1*c*. From the above it is apparent that the three-path core just described can be made responsive to certain signals and unresponsive to other signals; for instance, a Blocked core will be insensitive to current flow in either direction on the winding 33, and will be responsive to current in only one direction on the winding 34. If the core is Set or Primed it will be responsive to current on the winding 33 in only a single respective direction. However, the core can be Blocked by current through the winding 34 from either the Set or Primed state. It is these properties of the three-path core upon which depend the characteristics of magnetic core logic circuits and memory in the illustrative embodiment disclosed herein. If an unlimited current is applied to the winding 33, in the direction of the arrow shown in FIG. 1*a*, it would be possible to spuriously unblock the core; since the right-most leg is saturated in the clockwise direction, current opposite to the arrow would have no effect. With current limited to that necessary to switch the flux about only one aperture (I*m*), the operation will be as described above.

Figure 3:
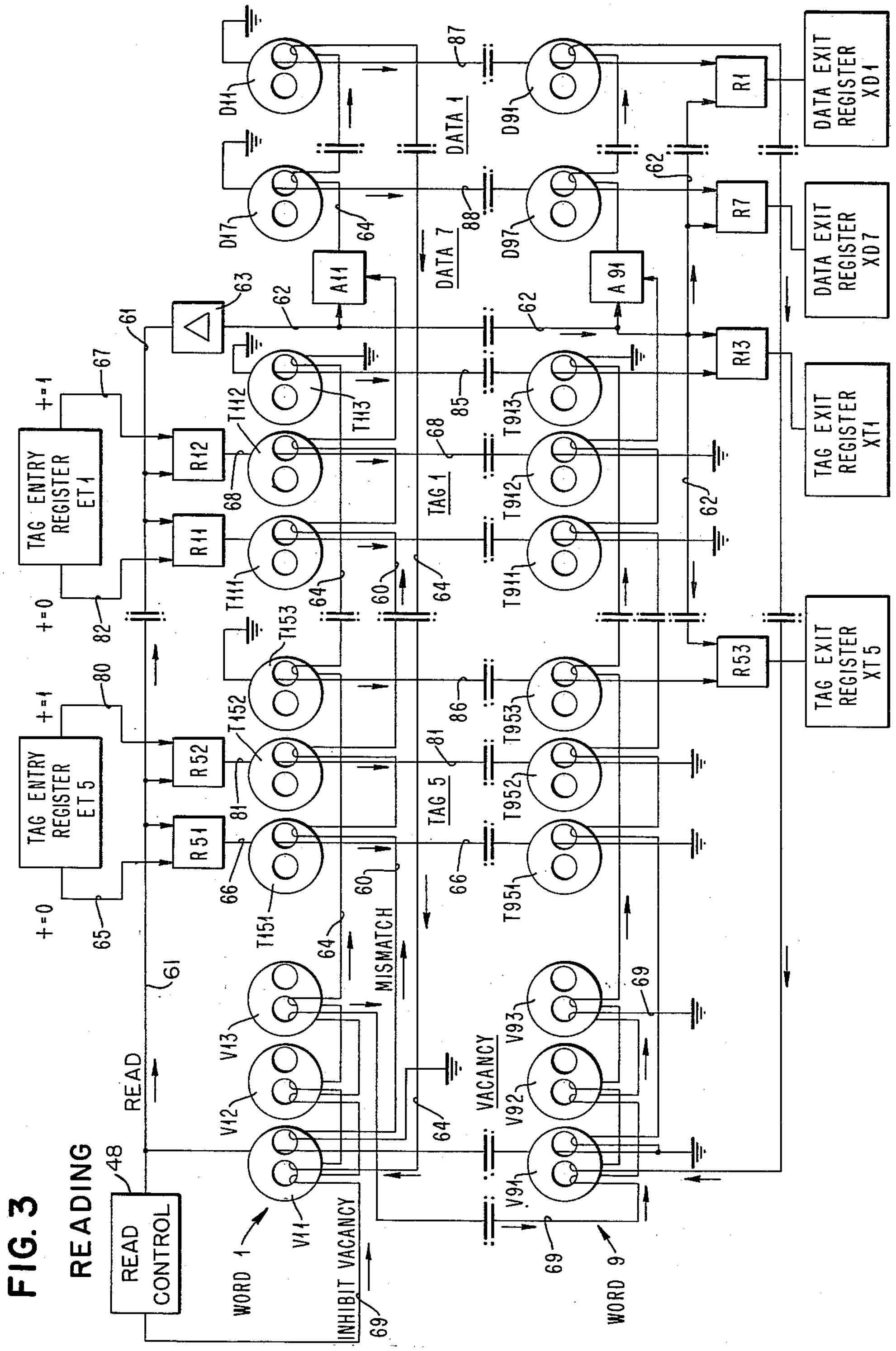
FIG. 3 is a simplified schematic diagram of the embodiment of FIG. 2 in which the cores and the reading circuits are shown.

For illustration with simplified nomenclature, the embodiment of this invention to be described is a memory array having nine word registers each comprising seven data bits and five tag bits. In FIGS. 2 and 3, only the first and last word registers thereof (Word 1 and Word 9, respectively), are shown; similarly only two tag bit and two data bit positions are shown for each word register (Tag 1, Tag 5 and Data 1, Data 7, respectively). As will be apparent from the following complete description, any number of word registers each having a suitably large number of Tag and Data positions or bits could be used. The third Tag cores T113, T153, T913, T953 and the Data cores D11, D17, D91, D97 are storage elements merely, and do not exercise any control functions over the remaining circuitry, whereas the Vacancy cores V11, V12, V13, V91, V92, V93 and first pairs of Tag cores T111, T112, T151, T152, T911, T912, T951, T952 perform logical functions which control the circuit operation, which is more fully described hereinafter.

FIGS. 2 and 3 are complementary figures; on FIG. 2 are shown representative cores and only the circuitry used in the writing operation; in FIG. 3 the same cores as in FIG. 2 are shown with only the circuitry used in the reading operation; not that the only elements used in both reading and writing are the cores themselves and the tag entry registers ET1, . . . ET5.

Reading and writing operation charts are shown in FIGS. 4 and 5 respectively. In each of these charts, "B" means the Blocked core condition above described, "S" means Set, and "P" means the Primed state. Only those states into which the cores will switch in response to the related control signals are shown; in each blank box of the charts the core has remained in the last state shown. The charts should be consulted automatically as each phase of operation is described with reference to the schematic diagrams in FIGS. 2 and 3. In the following description, a "positive" pulse or signal is taken to mean one of such polarity that the related conventional current will be in the direction of the arrows shown in FIGS. 2 and 3; a negative signal will be opposite to the direction of those arrows.

*Writing*

Referring now to FIG. 2, a Write Control circuit 49 which may be part of the associated data processing apparatus) supplies signals to the memory over a pair of lines 35, 43 to control the writing operations described hereinafter. The first writing step is testing, in sequence, each of the word registers for vacancy to determine if there is room to enter more data. This is done by applying a positive Vacancy Test signal on a line 35, which signal will first determine whether or not the Word 1 register is vacant and if the Word 1, register is not vacant, the Vacancy Test signal will cause an output from Word 1 to test the Word 2 register for vacancy. Assuming that Word 1 is occupied, cores V11 and V12 will be Blocked, and core V13 will be Set, prior to the application of the Vacancy Test signal on line 35. Since core V12 is Blocked, the Vacancy Test pulse on line 35 will not affect the state of the core, and there will be no output therefrom; but core V13 is Set, and the signal on line 35 will cause it to become Primed, which will in turn generate a positive output signal on a line 36. The signal on line 36 passes through an amplifier A14, and is carried over a corresponding line 37 to the Word 2 register vacancy cores (not shown). In a like manner, assuming that the first eight out of nine word registers are occupied, and that the ninth word register is vacant, the cores V13, (V23, . . . V83, not shown) will each provide a vacancy test pulse to the next higher word position as above described. Therefore a vacancy test pulse will be applied to the line 38 to test for vacancy in the Word 9 register. In the vacant Word 9 register (or any vacant register), core V91 is Set, core V92 is Set, and core V93 is Blocked. The Vacancy Test signal on line 38 will therefore cause core V92 to become Primed. But since V93 is Blocked, there will be no output pulse on a line 39 to its amplifier A94 (as there was to the amplifier A14, above) and therefore no All Occupied signal will be generated on line 40. When core V92 is Primed, a positive output is generated on the line 41 which goes to two amplifiers, A92 and A93. A93 is designed so that it will not respond to positive inputs, but only to negative inputs; therefore there will be no output from A93 as result of the positive pulse on line 41. Amplifier A92 will respond to the positive pulse on line 41 and generate a positive Entry signal of amplitude I*m* on a line 42, which line passes through the left-hand aperture of the Tag and Data cores in the Word 9 register in a manner so as to Block each of these cores; this amounts to an erasing of all the Tag and Data cores in the Word 9 register.

The next step in writing occurs when a negative Write signal is applied to the line 35. As before, this will have no effect on the occupied word registers since in occupied registers the cores V12 (V22, . . . V82, not shown) are Blocked. However, the negative Write signal on line 35 will cause the core V13 to change from Primed to Set, which in turn will give a negative signal on line 36 for amplification by A14 which is carried over line 37 to the next word register. At this point it should be noticed that the Write signal has re-established the initial condition in core V13 removing the alteration caused by the Vacancy Test signal. Therefore, a negative Write signal will appear on line 38 causing V92 to resume the Set state. The amplifier A92 is level-adjusted to give a positive output current of amplitude I*m* in response to a positive imput signal, and to give a negative output current of one-half I*m* in response to a negative input. As a result of V92 switching from Primed to Set, a negative pulse appears at the input of A92 and causes a negative current of one-half I*m* to pass over the line 42, which tends to set all of the Word 9 register cores. At the same time that the negative Write signal is applied to the line 35 (just now described), a positive Write pulse is applied on the line 43. This is a timing pulse used to gate the entry registers ET1, . . . ET5, ED1, . . . ED7. The entry registers are any well-known bistable devices (such as triggers) which give alternative outputs of opposite polarity in response to binary numbers One and Zero stored therein. The output of the entry registers is combined with the Write pulse on line 35 to excite selected corresponding write gates W11, W12, W13, . . . W51, W52, W53, W1, . . . W7. These gates respond to coincident positive inputs by generating a positive current of one-half I*m* on a corresponding output line, for instance the line 44 associated with the gate W51. Assuming that the tag of the word to be stored has the bonary bit One in tis fifth bit position, the right-hand output of trigger ET5 will be positive, so that gates W51 and W53 will generate output currents of one-half I*m* on lines 44 and 45 respectively. The currents in lines 44 and 45 together with that in line 42 generate sufficient flux to Set cores T951 and T953 respectively. Core T952 has one-half I*m* applied to it by line 42, but this is not sufficient to switch the core, so it will remain Blocked. Similarly, assuming a Zero in the seventh Data bit and a One in the first Data bit, core D97 will remain Blocked, and core D91 will become Set. Since each of the gates W51, W52, etc., supplies only one-half I*m* to the related column of cores T151, . . . T951, T152, . . . T952, etc., only the cores in a word register which also supplies one-half I*m* to each of its cores (on a line 42, for instance) will receive enough current to switch from Blocked to Set. This is a "half-select" type of word register selection by means of which data is entered in only the correct word register, although the gate output wires extend through all of them.

Returning now to the occurrence of the negative Write pulse, the negative output from V92 on line 41 also goes to the amplifier A93, which may be a single shot (or monostable) multivibrator, or other device capable of generating a delayed positive output current of a determinable extended duration in response to a negative input pulse. This delayed positive output current is applied by a line 47 to Set core V93 and Block cores V91 and V92, thereby indicating that the Word 9 register is now occupied.

In summation of a writing operation, if the word register is occupied, one of the Vacancy cores V13, . . . V93 responds so as to test the next word register in turn. If the register is vacant, another Vacancy core V12, . . . V92 resets all the Tag and Data cores and then provides half-select current (one-half I*m*) to Set those of the cores which also receive half-select current from the entry registers. The states of the Vacancy cores are next reversed to indicate the register is occupied.

*Reading*

When data is to be read out of the storage, the Tag portion of the desired word is entered into the Tag entry registers ET1, . . . ET5 (FIG. 3), each of which controls the related column position Tag 1, . . . Tag 5 of all the registers Word 1, . . . Word 9. The actual reading out of data from the Data cores in each word register is effected by a corresponding amplifier A11, . . . A91. These amplifiers are of any well-known type which will respond to either positive or negative inputs (i.e., on a line 62), unless inhibited by signals of like polarity (i.e., on a line 60), to give respective positive or negative current outputs. The reading operation is controlled by a Read-Control circuit 48 (similar to the circuit 49) which applies signals to a pair of lines 61, 69 as described hereinafter. Reading is initiated by a positive Read signal on a line 61, which interrogates the Vacancy and Tag cores to locate the correct word register. In a word register which is vacant, or in which is stored a word different from the one desired, a Mismatch, or disabling signal is generated (for example, on a line 60) to inhibit, or disable the operation of the corresponding one of the amplifiers A11, . . . A91. The Read signal on line 61 is also applied to the inputs of all of the amplifiers A11, . . . A91 (line 62) after being delayed. Therefore, the Read signal tends to operate each of the amplifiers A11, . . . A91, and also interrogates Vacancy and Tag cores to inhibit the amplifiers in all but the correct word register. Assuming for the following discussion that the Word 1 register is vacant (FIG. 5*a*) core V11 will be Set, core V12 will be Set, and core V13 will be Blocked. The first step in interrogation is the application of the positive Read signal on line 61 which passes through the right hole of each of the cores V11, . . . V91. Since V11 is Set, this pulse will switch the core to the Primed state and induce a positive Mismatch signal on the line 60. The positive Read signal on line 61 is delayed in a Delay unit 63 and is then passed over a line 62 to the input of the amplifier A11, which in turn delivers a positive driving current to a line 64, unless inhibited by a positive Mismatch pulse on the line 60. In this case, since the word register is vacant, and core V11 is switched by the positive Read pulse, a Mismatch pulse does occur on line 60 and inhibits (or disables) A11, so there is no driving pulse on line 64, and the Data cores will not be read out. The Delay unit 63 provides enough delay to compensate for the ordinary circuit response time required in testing core V11 (or as described below, the time lost in interrogating the Tag cores T151, T152), so that the delayed positive Read pulse on line 62 appears at the input to the amplifier A11 within the period during which the Mismatch pulse on line 60 may occur to inhibit the amplifier. Recalling the description of the writing operation in the preceding section, each of the Tag bit cores T151, T152 will be in either the Blocked or Set state. In either of these conditions, the cores are saturated with clockwise flux around the right-hand hole, and the positive signal on line 60 will therefore have no effect on cores T151 or T152. Since a saturation flux represents an open circuit to a magnetic winding, the cores will have no effect on the signal. Therefore, it can be seen that no problem arises by the fact that the Mismatch line 60 connects V11 in series (as shown) with the Tag cores T151 and T152 for purposes of testing Vacancy and Mismatch. This novel circuitry thereby provides a simple, single means for testing for the correct tag in a register now in use, preventing the erroneous reading out of a now unwanted prior word having the same tag.

Now assume that the Word 1 register is not vacant. Cores V11 and V12 will be Blocked, and core V13 will be Set (FIG. 5*b*), as before described. Therefore, a positive Read signal on line 61 will be ineffective against the core V11, and no vacancy output signal therefrom will appear on the line 60.

The positive read pulse on the line 61 used to test for vacancy as just described is also concurrently used to gate the Tag entry registers ET1, . . . ET5 through corresponding read gates R11, R12, . . . R51, R52. These gates are responsive to coincident positive inputs or coincident negative inputs to provide positive or negative output currents respectively; any suitably adjusted AND circuit or amplifier may be used to suit design expediency. If the Tag of the word desired to be read out has a Zero in its fifth bit position, the entry register ET5 will have a positive left-hand output on a line 65 which will condition the gate R51 to give a positive current output on a line 66 when the Read signal appears on line 61. Similarly, if the desired word has a One in its first bit position, the entry register ET1 will have a positive right-hand output on a line 67 which will condition the gate R12 to give a positive current output on a line 68 in coincidence with the Read signal on line 61. Assuming that the tag of the word stored in the Word 1 register has a One in its fifth bit position (FIG. 5*b*), core T151 will be Set, and core T152 will be Blocked. The signal output (line 66) from R51 will switch T151 from Set to Primed which in turn induces a positive Mismatch current on line 60. If the stored word has a Zero in its first bit position, core T111 will be Blocked and core T112 will be Set. The current from gate R12 will change T112 from Set to Primed and generate a positive Mismatch signal on line 60, concurrently with the signal generated by core T151. Note that any Mismatch signal on line 60 is positive, whether the signal resulted from interrogating a Tag bit position storing a One (Tag 5, above) or a Zero (Tag 1, above), and that simultaneous interrogation of several Tag positions is therefore possible without cancellation of Mismatch signals resulting from opposite polarity of signals indicating mismatch of binary bits. This feature results from the fact that only one of each pair of the Tag cores will be tested, depending on the Tag data in the entry registers ET1, . . . ET5. That core of the pair of cores in any Tag bit position which should have been Blocked if a Tag bit One is stored therein, will be interrogated to see if it is Blocked; if it is Blocked the core will be incapable of having an output pulse, so no mismatch will occur. On the other hand if it is not Blocked, when it is interrogated it will be switched to Primed and generate a positive mismatch signal on line 60, thus indicating that a failure to match has occurred. (The core which should not be Blocked is not tested, since interrogating it will generate a mismatch signal if it is not blocked; and yet, if it should not be blocked and is not blocked there is no mismatch in fact.)

Now assume that the Tag of the desired word and the Tag stored in the Word 1 register each have a One in the fifth bit position and a Zero in the first bit position (FIG. 5*c*). The entry register ET5 will have a positive left-hand output on a line 80, which will combine with the positive Read pulse on line 61 to promote a positive current output from gate R52 on a line 81. The current on line 81 tends to Prime the core T152 but, the core being Blocked, the current will be ineffective, and there will be no mismatch pulse induced. Similarly, the left-hand output of ET1 on a line 82 will cause gate R11 to send current through core T111, but since this core is also Blocked, it will not produce a Mismatch signal on line 60.

In an occupied word register having a tag identical with that of the desired word, no vacancy or mismatch occurs so the amplifier A11 will not be inhibited by any Mismatch signals on line 60; therefore, when the positive Read signal on line 61 passes through the Delay unit 63 onto line 62 it will cause the amplifier A11 to pass a positive current over a line 64. This current tends to Prime all of the Data cores D11, . . . D17 in the Word 1 register, also tends to Block the vacancy cores V11 and V12, tends to Set core V13, and tends to Prime the third Tag cores T113, . . . T153. If the Tag cores T113, . . . T153 or any of the Data cores D11, . . . D17 have had the binary bit One stored therein, the cores will be in the Set state prior to the appearance of the positive pulse on the line 64. Any core previously set will therefore switch to the Primed state and generate a positive output pulse on a respectively corresponding Output line 85, . . . 86, 87, . . . 88; cores that did not have the data bit One stored therein will be in the Blocked state, the driving pulse on line 64 will have no effect thereon, and consequently there will be no output pulses on the corresponding ones of the Output lines 85, . . . 86, 87, . . . 88. The third Tag core output lines 85, . . . 86 thread each of the cores T113, . . . T913, . . . T153, . . . T953 in the corresponding column Tag 1, . . . Tag 5. However a positive signal on line 86, resulting from a tag bit One being sensed in T153, for instance, will tend to Set other Tag 5 cores such as T953. Since these cores are either Set (with a One) or Blocked (with a Zero), the current on line 86 will have no effect thereon. The line 86 is fed to a read AND circuit R53 where it is gated with the delayed positive Read signal on line 62, and registers a binary One in a Tag exit register XT5. In a similar manner, the Data cores D11, . . . D17 will also cause output currents on the respective lines 87, . . . 88, which currents are gated in corresponding read AND circuits R1, . . . R7 for entrance into Data exit registers XD1, . . . XD7. The Tag exit registers XT1, . . . XT5 are not necessary for a basic tag-addressed memory system, but are included to show the versatality of our invention. For instance, the Tag exit and entry registers could be compared to see if the desired tag in the entry register corresponds with the tag which was in fact selected and read out into the exit registers. The data stored in the Data exit registers XD1, . . . XD7 is the desired data word, and in fact, the end product of the reading operation.

After all testing and reading has been accomplished by the positive Read signal on line 61 and the delayed signal on line 62 the register is reset, and the status indication of the Vacancy cores is reversed by a negative Read signal applied to the line 61. The negative Read signal will tend to set each of the cores V11, . . . V91 in vacant word registers, which were previously Primed by the positive Read signal, and will have no effect on the vacancy cores V11, . . . V91 in occupied word registers, which cores are still Blocked. The negative Read signal will also drive the outputs of the level-adjusted read AND circuits R11, R12, . . . R51, R52 negative, causing a negative current on corresponding lines 68, . . . 81, 66, etc. This tends to Set the Tag cores T111, T112, . . . T151, T152, . . . T911, T912, . . . T951, T952, but will be effective only against cores which were previously Primed by the positive Read signal. After being retarded by the Delay unit 63, the negative Read signal on line 62 will be amplified by those of the amplifiers A11, . . . A91 which are not inhibited by negative signals on line 60, etc. As the negative Read signal re-Sets any Tag or Vacancy core, that core will produce a negative Mismatch signal in the same manner as the positive Mismatch signal was generated. Therefore, the amplifier A11, . . . A91 in any vacant or mismatched word register will be inhibited in response to both the positive and negative Read signals, or by neither of them. In a word register which was found to contain the correct data, for instance the Word 1 register, the amplifier A11 will not be inhibited by any negative Mismatch signals on the line 60, and the delayed negative Read signal on line 62 will cause a negative current output on line 64. This negative current will Set all of the Tag and Data cores which were Primed when read out, and will also change (or reverse) the condition of each Vacancy core to indicate that the register has been read out, and is now available to store another word. This is effected by the delayed negative current on line 64, which will Block V13, and Set V11 and V12. If the data is to be maintained in the word register for future use, a positive inhibit-Vacancy signal of amplitude equal to one-half $Im$ is applied on a line 69, which supplies opposing flux so as to leave the cores as they were. Since the Inhibit-Vacancy current tends to Block V11, . . . V91 and V12, . . . V92 and tends to Set V13, . . . V93, those cores in occupied word registers will be unaffected thereby, they being driven further into saturation in the same direction; limiting inhibit current to one-half $Im$ will prevent vacant word registers from being affected. This feature is called nondestructive readout. Note that the prior delayed positive signal (which caused readout) will not appear on line 64 except when the word register is occupied, and then will only tend to drive the cores V11, V12, V13 further into saturation in the Blocked, Blocked and Set states, respectively.

The manner in which the Vacancy cores are conditioned to represent vacancy is made to depend on whether or not the data stored in any register need be preserved for the future. If data is not read out in a given operation, the cores will not change their conditions; even when the data is read out, the Inhibit-Vacancy signal will preserve it for the future.

*Summary*

The circuits described herein have practical advantages which permit low initial cost, reliability and little or no maintenance.

The Set of Vacancy cores provides a vacant-responsive core for writing (V12) and one for reading (V11), and an occupied responsive core for writing (V13). The core V12, etc., prevents reading the wrong data out of a vacant register, so that particular tag bit combinations can be used over and over. It should be apparent that additional cores may easily be supplied to operate in the same manner as the cores V11, V12 and V13 to provide additional functions in any specialized design. An example of the use of an additional core to provide a special function has been illustrated by the provision of the third Tag core (T153, for instance), which responds similarly to a first Tag core (T151) but provides a check on tag operation, or some other function, instead of controlling read out.

The use of multiaperture cores makes installation of windings more difficult than it is with toroids, so a minimum of windings (or lines) per core is almost essential. We have shown how the cores can be interconnected for selective control or response by correct cores only, without the need for isolation amplifiers, extensive timing equipment, or complex wiring. Examples described include: the insensitivity of Tag cores to Vacancy core Mismatch pulses, and vice versa, which allows a single line (60) to provide the mismatch function in each word register; and the ability of a single set of entry registers to control corresponding columns of Data and Tag cores in all word registers simultaneously. The only adjunctive functions (those provided by external equipment) are the positive and negative Read and Write signals, the Vacancy-Test signal, and the Inhibit-Vacancy signal. Thus, simplicity of circuits and a minimum of external devices have been achieved by the combinations disclosed. The simplicity of our invention is further enhanced by the fact that the magnetic storage properties of multiapertured cores may be used to advantage therein; this means that the information corresponding to data or to the status of a register is not lost if there is a failure of power supplied to the circuits.

The various cores, amplifiers and other circuit elements have been chosen only as examples; any elements capable of assuming the two conditions and two states of the cores disclosed may be substituted therefor with appropriate circuit changes by one skilled in the art; other gating and amplifying devices may be used to suit design preferences in a particular machine.

While our invention has been particularly shown and described with reference to a preferred embodiment thereof, it will be understood by those skilled in the art that the foregoing and other changes in form and details may be made therein without departing from the spirit and scope of our invention.

We claim:

1. A control device for a memory apparatus having a plurality of data storage registers, comprising: signal means for applying a pair of signals, one after the other, to all of said registers in common; a plurality of vacancy designating means, one for each of said registers, each having two alternative conditions; a plurality of setting means, one for each of said registers, each effective to set the corresponding one of said vacancy designating means to either of said conditions in dependence upon the vacant or occupied status, respectively, of the corresponding register; a plurality of readout means, one for each register, each including means to read data out of the corresponding register in response to said first signal and to reset said register and cause the corresponding setting means to reverse the condition of the related vacancy designating means in response to said second signal; and a plurality of control means, one for each register, each effective to render the operation of the corresponding one of said readout means dependent upon the condition of the respectively corresponding vacancy designating means.

2. A control device for a plurality of data registers of the type which may be interrogated to determine the information content thereof, and in which restoration of the information is required before subsequent interrogations may occur, comprising: a signal means for generating a pair of signals, one after the other; a vacancy means for each of said registers, each of said vacancy means being conditioned to supply a disabling signal in response to said first signal when the corresponding register is vacant, and capable of being selectively conditioned so as to be unresponsive to said pair of signals when said corresponding register is occupied; control means operable to interrogate all of said registers concurrently in response to said first signal and to restore all of said registers and reverse the condition of said vacancy means in response to said second signal; a disabling means for each of said registers, each operable to selectively disable the operation of said control means on the corresponding register in response to said disabling signal to thereby prevent interrogation and restoration of said corresponding register; and selectively operable inhibit means for rendering said vacancy means unresponsive to the reversing operation of said control means.

3. A device for selecting items capable of assuming a positive or a negative status, employing a plurality of elements, each element having a responsive condition in which it will generate a signal output when receiving an input signal, each element also having an unresponsive condition, comprising: a plurality of element pairs, each pair corresponding to a selectable item; a status responsive means for each of said pairs, each operable to set a first element of the related pair to said responsive condition and the second element of said pair to said unresponsive condition, or vice versa, in dependance on a negative or positive status of the corresponding item, respectively; signal means for sending an interrogation input signal simultaneously to both elements in a first pair of said sequence of pairs; interconnection means between the output of said second element and the input of the next subsequent pair in said sequence; and means operable by an output signal of said first element for first changing the status of the corresponding item, and for thereafter reversing the conditions of said first and second elements; whereby each pair either responds or tests the next pair until a subsequent pair responds so as to indicate a negative status, at which time the corresponding status is changed, and the conditions of said elements are caused to indicate the positive status of the corresponding item.

4. In a memory apparatus of the type having a sequence of registers each for storing a different group of intelligible data bits, a register selecting device comprising: a plurality of storage element pairs, one for each of said registers, each pair including a vacancy-responsive element and an occupancy-responsive element, each of said elements being alternatively operable to give an output signal in response to an input signal in dependence upon the corresponding register being occupied or vacant, respectively; signal means for sending an interrogation signal to both elements of a first one of said pairs; dual control means responsive to a signal output from said vacancy-responsive element for initiating the entrance of data into the related register, and for thereafter reversing the conditioning of said first pair of elements; and circuit means for connecting the output of said occupancy-responsive element to the next subsequent pair in said sequence, said signal means thereby testing said first pair to determine the status thereof, said first pair either initiating the read-in- of data and then causing said pair to indicate occupancy, if initially vacant, or testing the status of the next subsequent pair, if initially occupied.

5. A vacancy circuit in a data storage apparatus of the type having a plurality of word registers arranged in a sequence and employing a plurality of storage elements each capable of assuming an active condition, in which it may be switched between two stable states, and an inactive condition, said elements operable to generate output signals in response to being switched from one of said states to another, comprising: a series of storage element pairs, one for each of said word registers, each including a first storage element and a second storage element; control means for setting each pair of said elements so that the first element thereof is in a first one of said states and the second element thereof is in said inactive condition, or vice versa, in dependence on whether the corresponding word register is occupied or vacant, respectively; multipurpose timing signal means including means tending to switch both elements of a first pair of said elements into said second state, said signal means being ineffective with respect to elements in said inactive condition; occupancy indicating means responsive to an output signal from said first element of said first pair for tending to switch both elements of the next subsequent pair of said elements; a register controlling means for each word register, each responsive to an output signal from the second element of the related one of said pairs for conditioning the corresponding word register in preparation to receive data; said multipurpose timing signal means also including means effective to reset either element of said first pair from said second state back into said first state; said occupancy indicating means also being responsive to a resetting output signal from its related second element to tend to reset both elements of the next subsequent pair; said register controlling means also being responsive to a resetting output signal from its related first element to enter data into the corresponding word register; and a reversing means for each word register, each responsive to said resetting output signal of the related second element to set said second element in said inactive condition and said first element in said first state.

6. A vacancy circuit in a data storage apparatus of the type having a plurality of word registers arranged in a sequence and employing a plurality of storage elements each capable of assuming an active condition in which it may be switched between two stable states, and an inactive condition, said elements operable to generate output signals in response to being switched from one of said state to another, comprising: a series of storage element pairs, one for each of said word registers, each including a first storage element and a second storage element; control means for setting each pair of said elements so that the first element thereof is in a first one of said states and the second element thereof is in said inactive condition, or vice versa, in dependence on whether the corresponding word register is occupied or vacant, respectively; timing signal means for generating two signals, one delayed from the other, the first signal thereof tending to switch both elements of a first pair of said elements into said second state, said signals being ineffective with respect to elements in said inactive condition; occupancy indicating means effective in response to an output signal from said first element of said first pair to tend to set both elements of the next subsequent pair of said elements; a register controlling means for each word register, each operable in response to an output signal from the second element of the related one of said pairs to prepare the corresponding word register for receiving data; the second signal from said timing signal means being effective to reset either element of said first pair from said second state back into said first state; said occupancy indicating means also being responsive to a resetting signal output from its related second element to tend to reset both elements of the next subsequent pair; said register controlling means also being operable in response to a resetting output signal from its related second element to enter data into the corresponding word register; and a reversing means for each word register, each responsive to said resetting output signal of the related second element to set said second element in said inactive condition and said first element in said first state.

7. A vacancy circuit in a data storage apparatus employing a plurality of storage elements each capable of assuming an active condition, in which it may be switched between two stable states, and an inactive condition, said elements operable to generate output signals in response to being switched from one of said states to another, comprising: a first storage element and a second storage element; control means for setting said elements so that said first element is in a first one of said states and said second element is in said inactive condition, or vice versa, in dependence on whether the storage apparatus is occupied or vacant, respectively; multipurpose timing signal means including means tending to switch both of said elements into said second state, said signal means being ineffective with respect to an element in said inactive condition; occupancy sensitive means responsive to an output signal from said first element for indicating that the storage apparatus is occupied; storage controlling means responsive to an output signal from said second element for conditioning the storage apparatus in preparation to receive data; said multipurpose timing signal means also including means effective to reset either of said elements from said second state back into said first state; said storage controlling means also being responsive to a resetting output signal from said first element to enter data into said storage apparatus; and a reversing means responsive to said resetting output signal from said second element to set said second element in said inactive condition and said first element in said first state.

References Cited in the file of this patent

UNITED STATES PATENTS 2,907,004 Kun Li Chien et al. _______ Sept. 29, 1959